US010171345B2

(12) United States Patent
Menezes et al.

(10) Patent No.: US 10,171,345 B2
(45) Date of Patent: Jan. 1, 2019

(54) ROUTING COMMUNICATION SESSIONS

(71) Applicant: Microsoft Technology Licensing, LLC, Redmond, WA (US)

(72) Inventors: Pascal Francis Menezes, Bellevue, WA (US); Gunter Leeb, Redmond, WA (US); Amer Aref Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 14/703,681

(22) Filed: May 4, 2015

(65) Prior Publication Data

US 2016/0330106 A1 Nov. 10, 2016

(51) Int. Cl.
*H04L 12/707* (2013.01)
*H04L 12/911* (2013.01)
*H04L 12/741* (2013.01)
*H04L 12/703* (2013.01)
*H04L 12/721* (2013.01)
*H04L 12/723* (2013.01)

(52) U.S. Cl.
CPC .............. *H04L 45/22* (2013.01); *H04L 45/12* (2013.01); *H04L 45/28* (2013.01); *H04L 45/38* (2013.01); *H04L 45/50* (2013.01); *H04L 45/54* (2013.01); *H04L 47/823* (2013.01)

(58) Field of Classification Search
CPC ......... H04L 45/22; H04L 45/28; H04L 45/54; H04L 45/50; H04L 45/38; H04L 45/12; H04L 47/823; H04L 43/0882
See application file for complete search history.

(56) References Cited

U.S. PATENT DOCUMENTS

| 7,068,654 | B1 | 6/2006 | Joseph et al. |
| 8,700,782 | B2 | 4/2014 | Chandrasekaran et al. |
| 8,868,735 | B2 | 10/2014 | Wang et al. |
| 8,913,621 | B2 | 12/2014 | DelRegno et al. |

(Continued)

FOREIGN PATENT DOCUMENTS

WO 2014147197 A1 9/2014

OTHER PUBLICATIONS

"International Search Report and Written Opinion Issued in PCT Application No. PCT/US2016/030485", dated Aug. 10, 2016, 10 Pages.
"The Impact of Microsoft Lync to the Unified Communications Market", Retrieved From: <http://www.tonesoft.com/the-impact-of-microsoft-lync-to-the-unified-communications-market/> May 12, 2015, Oct. 11, 2013, 1 page.

(Continued)

*Primary Examiner* — Kwang B Yao
*Assistant Examiner* — Moo Jeong
(74) *Attorney, Agent, or Firm* — Schwegman Lundberg & Woessner, P.A.

(57) ABSTRACT

Techniques for routing communication sessions are described. According to various embodiments, a set of routing paths are available for routing a communication session across a network. For instance, the routing paths represent Label Switched Paths (LSPs) across a Multi-Protocol Label Switching (MPLS) network. According to various embodiments, attributes of a communication session are leveraged to identify a routing path for routing the communication session. According to various embodiments, performance degradation in a communication session across a particular routing path is detected such that a replacement routing path is selected.

20 Claims, 9 Drawing Sheets

(56) References Cited

U.S. PATENT DOCUMENTS

| | | | |
|---|---|---|---|
| 8,923,333 | B2 | 12/2014 | Khan et al. |
| 8,988,995 | B2 | 3/2015 | Fullarton et al. |
| 2003/0076840 | A1* | 4/2003 | Rajagopal ........... H04L 12/2602 |
| | | | 370/395.21 |
| 2009/0203375 | A1* | 8/2009 | Gisby .................... H04W 8/30 |
| | | | 455/426.1 |
| 2013/0097333 | A1 | 4/2013 | Bathurst et al. |
| 2014/0019626 | A1 | 1/2014 | Hubler et al. |
| 2014/0136718 | A1 | 5/2014 | Menezes et al. |
| 2014/0146664 | A1* | 5/2014 | Amante ................. H04L 45/50 |
| | | | 370/228 |
| 2014/0149572 | A1 | 5/2014 | Menezes et al. |
| 2015/0113164 | A1 | 4/2015 | Butler et al. |
| 2015/0117198 | A1 | 4/2015 | Menezes et al. |
| 2016/0127230 | A1* | 5/2016 | Cui ....................... H04W 40/02 |
| | | | 370/389 |
| 2016/0285720 | A1* | 9/2016 | Maenpaa .............. H04L 65/605 |

OTHER PUBLICATIONS

"Unified Communications Diagnostics Module", Available at: <http://www.nectarcorp.com/wp-content/uploads/2014/01/Unified_Communications_Diagnostics_Module-11.pdf>, Apr. 2014, 2 pages.

"HP Unified Communications Reference Architecture: Microsoft Lync", Available at: <http://www8.hp.com/h20195/v2/getpdf.aspx/4AA5-5628ENW.pdf?ver=1.0>, Dec. 2014, 58 pages.

Semeria,"Multiprotocol Label Switching", In Proceedings: White Paper Available at: <https://web.fe.up.pt/%7Ejruela/DOC/MPLS_JUN.pdf>, Sep. 27, 1999, 20 pages.

"Second Written Opinion", Application No. PCT/US2016/030485, dated Mar. 29, 2017, 7 pages.

"International Preliminary Report on Patentability", Application No. PCT/US2016/030485, dated Jun. 14, 2017, 8 pages.

* cited by examiner

ROUTING COMMUNICATION SESSIONS

BACKGROUND

Modern communication systems have an array of capabilities, including integration of various communication modalities with different services. For example, systems that enable users to share and collaborate in creating and modifying various types of documents and content may be integrated with multimodal communication systems providing different kinds of communication and collaboration capabilities. Such integrated systems are sometimes referred to as Unified Communication (UC) systems.

While UC systems provide for increased flexibility in communications, they also present a number of implementation challenges. For instance, UC data flows are typically routed over networks that are unaware of attributes of the individual flows. Thus, challenges arise in selecting an optimum routing path for a UC data flow, and in responding to changes in signal quality across a data path for a UC data flow.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for routing communication sessions are described. According to various embodiments, a set of routing paths are available for routing a communication session across a network. For instance, the routing paths represent Label Switched Paths (LSPs) across a Multi-Protocol Label Switching (MPLS) network. According to various embodiments, attributes of a communication session are leveraged to identify a routing path for routing the communication session. According to various embodiments, performance degradation in a communication session across a particular routing path is detected such that a replacement routing path is selected.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
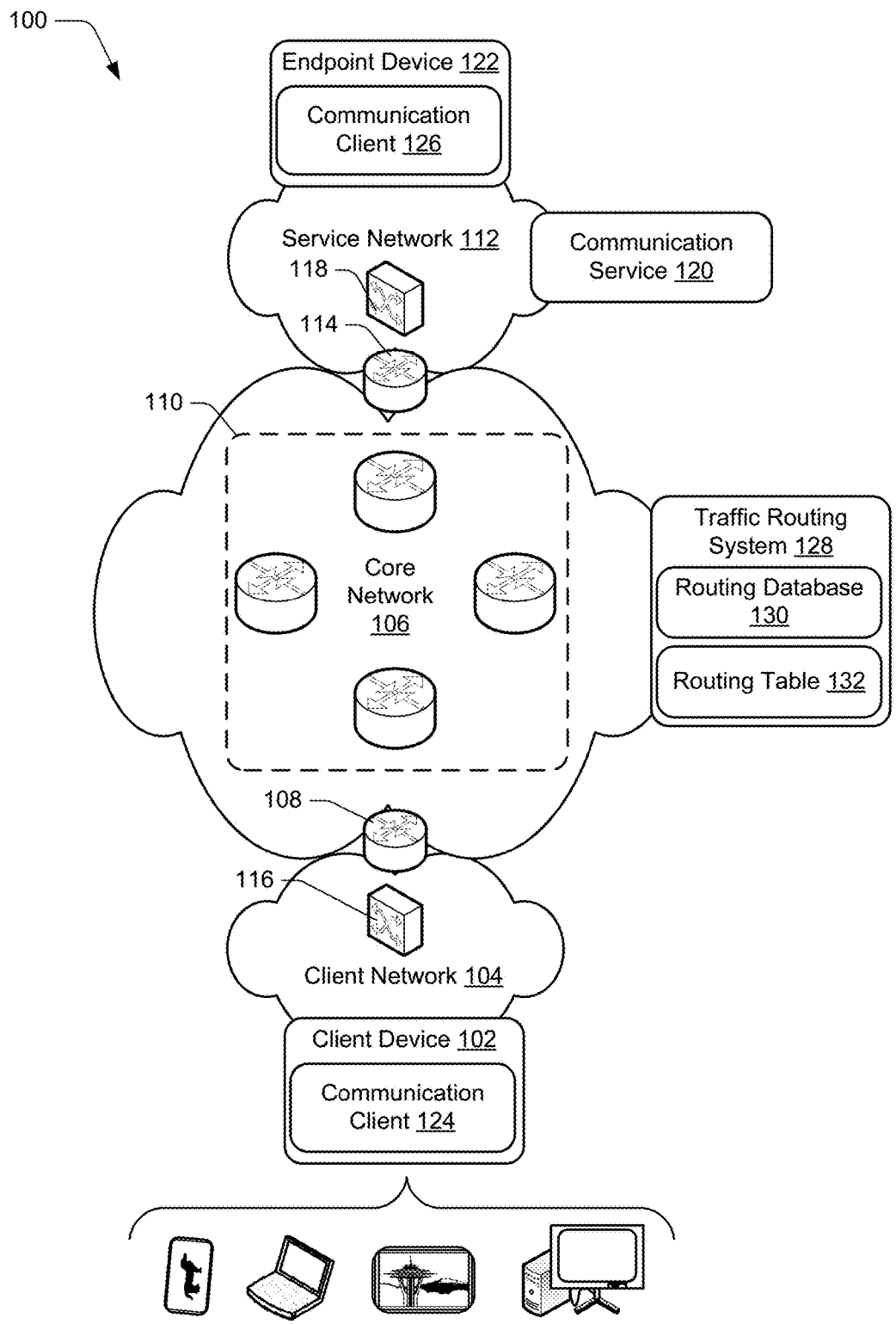
FIG. 1 is an illustration of an environment in an example implementation that is operable to employ techniques discussed herein.

Techniques for routing communication sessions are described. A communication session, for instance, represents an exchange of communication media between different nodes in a network. Examples of a communication session include a Voice over Internet Protocol (VoIP) call, a video call, text messaging, a file transfer, and/or combinations thereof. In at least some embodiments, a communication session represents a Unified Communication (UC) session.

According to various implementations, a set of routing paths are available for routing a communication session across a network. For instance, the routing paths represent Label Switched Paths (LSPs) across a Multi-Protocol Label Switching (MPLS) network. In at least some implementations, the MPLS network is implemented as and/or connected to a Software-Defined Network (SDN). Thus, techniques for SDN may be employed for managing and/or connecting to the MPLS network.

According to various implementations, attributes of a communication session are leveraged to identify a routing path for routing the communication session. For instance, media and/or bandwidth requirements are used to identify a routing path that is a best candidate for providing an optimum user experience during the communication session. As an example, a routing path is selected that meets a minimum bandwidth capacity and that meets certain signal quality requirements, such as based on past performance metrics across the routing path. Thus, information describing the selected routing path is communicated to an entity involved in routing the communication session to cause the communication session to be routed over the routing path. In at least some implementations, the communication session is rerouted from to the routing path from a previous routing path.

According to various implementations, performance degradation in a communication session across a particular routing path is detected such that a replacement routing path is selected. For instance, state information for the communication session indicates that signal quality for the communication session is decreased. In response, a replacement routing path is identified that is able to provide increased session quality for the communication session. The communication session is then rerouted to the replacement routing path.

Accordingly, techniques described herein provide for performance optimization for communication sessions such as by selecting best candidate paths for routing communication sessions. Further, performance degradation experienced during a communication session is mitigated by selecting replacement routing paths that can be leveraged to increase session quality for the communication session.

In the following discussion, an example environment is first described that is operable to employ techniques described herein. Next, a section entitled "Propagating Attributes of Communication Sessions" discusses some example ways for notifying different communication components of attributes of communication sessions. Following this, a section entitled "Example Implementation Scenarios" describes some example implementation scenarios in accordance with one or more embodiments. Next, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for routing communication sessions described herein. Generally, the environment 100 includes various devices, services, and networks that enable communication via a variety of different modalities. For instance, the environment 100 includes a client device 102 connected to a client network 104. The client device 102 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), and so forth.

The client network 104 is representative of an enterprise network that provides the client device 102 with connectivity to various networks and/or services. For instance, the client network 104 represents a local area network (LAN) for a particular entity, such as an enterprise entity, an education entity, a government entity, and so forth. The client network 104 may be provided and/or managed by a particular enterprise entity, such as an Internet Service Provider (ISP). The client network 104 may provide the client device 102 with connectivity via a variety of different connectivity technologies, such as broadband cable, digital subscriber line (DSL), wireless data connectivity (e.g., WiFi™), T-carrier (e.g., T1), Ethernet, and so forth.

The client network 104 is connected to a core network 106 via a provider edge (PE) router 108. According to one or more implementations, the core network 106 is representative of different connected components that exchange, process, and/or route data across different routing paths. The core network 106, for instance, includes core routers 110 that can be leveraged to generate different routing paths for routing data across the core network 106. According to various implementations, the core routers 110 can be leveraged to generate routing paths between the client network 104 and a service network 112. For example, data is routed from the core network 106 to the service network 112 via a PE router 114.

According to various implementations, the client network 104 and the service network 112 include a network switch 116 and a network switch 118, respectively. Generally, the network switches 116, 118 are representative of functionality for receiving data from their respective networks and routing the data across routing paths generated within the core network 106. As further detailed below, the network switches 116, 118 can utilize various information and logic to identify routing paths to be used for routing data flows across the core network 106.

Connected to and/or implemented as part of the service network 112 is a communication service 120, which is representative of a service to perform various tasks for management of communication between the client device 102 and an endpoint device 122. Generally, the endpoint device 122 is representative of any device with which the client device 102 may exchange data, such as an end-user device connected to the service network 112. The communication service 120, for instance, can manage initiation, moderation, and termination of communication sessions. Examples of the communication service 120 include a VoIP service, an online conferencing service, a UC service, and so forth. In at least some embodiments, the communication service 120 may be implemented as or be connected to a private branch exchange (PBX) in communication with a Public Switched Telephone Network ("PSTN") to enable voice communication between the client device 102 and the endpoint device 122.

In at least some implementations, the client device 102 is configured to interface with the communication service 120 via a communication client 124 to enable communication between the client device 102 and the endpoint device 122. The communication client 124 is representative of functionality (e.g., an application and/or service) to enable different forms of communication via the client device 102. Examples of the communication client 124 include a voice communication client (e.g., a VoIP client), a video communication client, a messaging application, a content sharing application, and combinations thereof. The communication client 124, for instance, enables different communication modalities to be combined to provide diverse communication scenarios.

According to one or more implementations, the communication client 124 represents an application that is installed on the client device 102. Additionally or alternatively, the communication client 124 can be implemented as a remote application, such as accessed via a web browser, a web application, and so forth.

The endpoint device 122 includes a communication client 126, which represents an instance of the communication client 124 that can be leveraged by the endpoint device 122 to communicate with other devices. For instance, a communication session between the client device 102 and the endpoint device 122 represents an exchange of communication media between the communication client 124 and the communication client 126.

The environment 100 further includes a traffic routing (TR) system 128, which is representative of functionality for determining routing paths for routing data across the core network 106. In at least some implementations, the TR system 128 is implemented by and/or as part of a network controller for the core network 106. For instance, one or more of the client network 104, the core network 106, and/or the service network 112 may be implemented as an SDN network, and thus the TR system 128 may be implemented as part of an SDN controller for managing connectivity across the core network 106.

The TR system 128, for instance, ascertains attributes of routing paths across the core routers 110, such as current and/or historical performance quality across the different routing paths. Based on these attributes, the TR system 128 identifies routing paths for routing communication sessions across the core network 106, such as a routing path that is best suited for routing a particular communication session between the client device 102 and the endpoint device 122. Further, in response to various events (e.g., a bad session event), the TR system 128 is configured to dynamically configure and reconfigure routing paths across the core network 106, such as to accommodate changes in performance quality for data flow across the core network 106.

According to one or more embodiments, the TR system 128 includes connectivity and logic that accesses routing information across the core network 106. For instance, the TR system 128 can access an Interior Gateway Protocol (IGP) and/or spanning tree switching topology for the core network 106. This enables the TR system 128 to identify different routing paths, and to map and remap the different routing paths between the client network 104 and the service network 112. The TR system 128 stores this information as part of a routing database (DB) 130, which is representative of functionality to track and store routing information across the core network 106.

In at least some embodiments, the TR system 128 characterizes the different routing paths within the routing DB 130 as being associated with respective instances of the core routers 110. For instance, each of the core routers 110 is separately identifiable, such as via a respective identifier and/or address. Thus, the TR system 128 can leverage the core routers 110 to identify and differentiate different routing paths, and can store this association between individual routing paths and the different core routers 110 as part of the routing DB 130.

The routing DB 130 is further augmented with path capability and performance data from the core network 106, such as indications of data flow capabilities and data flow quality across the core routers 110. For instance, individual routing paths can be characterized in the routing DB 130 based on data flow capacity across the individual paths, such as an average and/or maximum bandwidth for each routing path.

Further, individual routing paths can be characterized in the routing DB 130 based on historical data flow quality metrics. The quality metrics can be gathered automatically, such as based on notifications discussed herein from the communication service 120 and/or the communication clients 124, 126. Alternatively or additionally, the quality metrics may be received in response to user feedback regarding the quality of particular communication sessions. Thus, some routing paths across the core network 106 may be characterized in the routing DB 130 as historically providing a higher quality user experience than others of the routing paths.

In at least some embodiments, the TR system 128 maintains active state awareness of routing paths across the core network 106 via a routing table 132. For instance, the routing table 132 tracks connectivity attributes of the different routing paths for active communication sessions, such as quality metrics for data flow across the individual core routers 110. The routing table 132, for example, includes records for active communication sessions and dynamically updates the records, such as based on changes in routing path, changes in connection quality, and so forth. In at least some implementations, data such as quality metrics from the routing table 132 can be used to update the routing DB 130. For instance, quality metrics for individual routing paths can be updated in the routing DB 130 based on quality metrics obtained from the routing table 132.

As further detailed below, the routing DB 130 and the routing table 132 can be leveraged to route and reroute communications across the core network 106, such as to perform route optimization for communication sessions. Further details and implementations of the various entities of the environment 100 are discussed below.

In at least some implementations, the client network 104, the core network 106, and the service network 112 are implemented using techniques for Multi-Protocol Label Switching (MPLS). For instance, the core routers 110 can be leveraged to generate different MPLS Label Switch Paths (LSPs) across the core network 106. Further, the client network 104 may be implemented as a Virtual Private Network (VPN) that provides connectivity across different nodes within the client network 104, and from the client network 104 across the core network 106 and on to other networks, such as the service network 112. Thus, in at least some implementations, routing paths generated by the TR system 128 represent different LSPs that traverse the core network 106 to provide connectivity between the client network 104 and the service network 112.

While the environment 100 is discussed with reference to a particular instance of the client device 102 and the endpoint device 122, it is to be appreciated that techniques for routing communication sessions described herein can be employed to route communication data for many different devices and networks in accordance with the claimed embodiments.

Having described an example environment in which the techniques described herein may operate, consider now a discussion of example ways of propagating various attributes of communication sessions in communication systems in accordance with one or more embodiments.

Propagating Attributes of Communication Sessions

According to various embodiments, techniques can be employed to dynamically enlighten various network components with information about communication sessions. For instance, notification events can be generated that include various attributes of communication sessions. The notification events can be propagated to different entities further to techniques for routing communication sessions discussed herein.

In at least some embodiments, notification events can be configured using a communication application programming interface (API) that can be leveraged to configure and communicate session information to various network components involved in a communication session. For example, the communication API can identify dialogue events and session events for which attributes of a communication session can be identified. Consider, for instance, the following events and attributes that may be conveyed via a notification event generated by the communication API:

Dialogue Events—

These events apply to various portions of a communication session, such as the start, update, and end of a communication session. A dialogue event can include one or more of the following example attributes.

(1) Timestamp: This attribute can be leveraged to specify timestamps for a start of a communication session, updates that occur during a communication session, and an end (e.g., termination) of a communication session.

(2) Source IP Address: This attribute can be leveraged to specify an IP address for a device that is a source of media during a communication session, e.g., a device that initiates a communication session.

(3) Destination IP Address: This attribute can be leveraged to specify an IP address for a device that is to receive media as part of a communication session.

(4) Transport Type: This attribute can be leveraged to specify a transport type or combination of transport types for a communication session. Examples of transport types include Transmission Control Protocol (TCP), User Datagram Protocol (UDP), and so forth.

(5) Source Port: this attribute can be leveraged to specify an identifier for a port at a source device, e.g., a source device identified by the Source IP Address referenced above.

(6) Destination Port: This attribute can be leveraged to specify an identifier for a port at a destination device, e.g., a destination device identified by the Destination IP Address referenced above.

(7) Media Type: This attribute can be leveraged to specify a media type and/or types that are to be transmitted and/or are being transmitted as part of a communication session. As discussed elsewhere herein, the communication session can involve multiple different types of media. Thus, the Media Type attribute can be employed to identify media types in a communication session, such as for applying the service policies discussed herein.

(8) Bandwidth Estimation: This attribute can be leveraged to specify an estimated bandwidth that is to be allocated for a communication session. The estimated bandwidth, for instance, can be based on various factors, such as a privilege level associated with a user, type and/or types of media included in a communication session, and so forth.

(9) To: This attribute can be leveraged to identify a user to which media in a communication session is to be transmitted.

(10) From: This attribute can be leveraged to identify a user from which media and a communication session is transmitted.

(11) Error Code: This attribute can be leveraged to specify various error codes for pairs that may occur as part of a communication session. For example, errors can include errors that occur during initiation the communication session, errors that occurred during a communication session, errors that occur when a communication session is terminated, and so forth.

Session Problem Events—

These events can be generated and applied when a communication session experiences errors, performance degradation, and so forth. A session problem event may include one or more of the attributes discussed above with reference to Dialogue Events, and may also include one or more of the following attributes.

(1) Mean Opinion Score (MOS) Degradation: This attribute can be leveraged to specify a MOS for a communication session. The attribute, for instance, can be used to indicate that an overall quality of a communication session has decreased.

(2) Jitter Inter-Arrival Time: This attribute can be leveraged to specify jitter values for a communication session. The attribute, for instance, can be used to indicate that a jitter value or values have increased, e.g., have exceeded a specified jitter value threshold.

(3) Packet Loss Rate: This attribute can be leveraged to specify a packet loss rate for a communication session. The attribute, for instance, can be used to indicate that a packet loss rate has increased, e.g., has exceeded a specified packet loss rate value threshold.

(4) Round Trip Delay (RTD): This attribute can be leveraged to specify RTD values for packets in communication sessions. The attribute, for instance, can be used to indicate that RTD values for packets have increased, e.g., have exceeded a specified RTD value threshold.

(5) Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

Thus, various notifications discussed herein can include one or more of the attributes discussed above and can be used to propagate the attributes to various entities.

Having described an example ways of propagating attributes of communication sessions, consider now some example implementation scenarios for routing communication sessions in accordance with one or more embodiments.

Example Implementation Scenarios

The following section describes example implementation scenarios for routing communication sessions in accordance with one or more embodiments. The implementation scenarios may be implemented in the environment 100 discussed above, and/or any other suitable environment.

Figure 2:
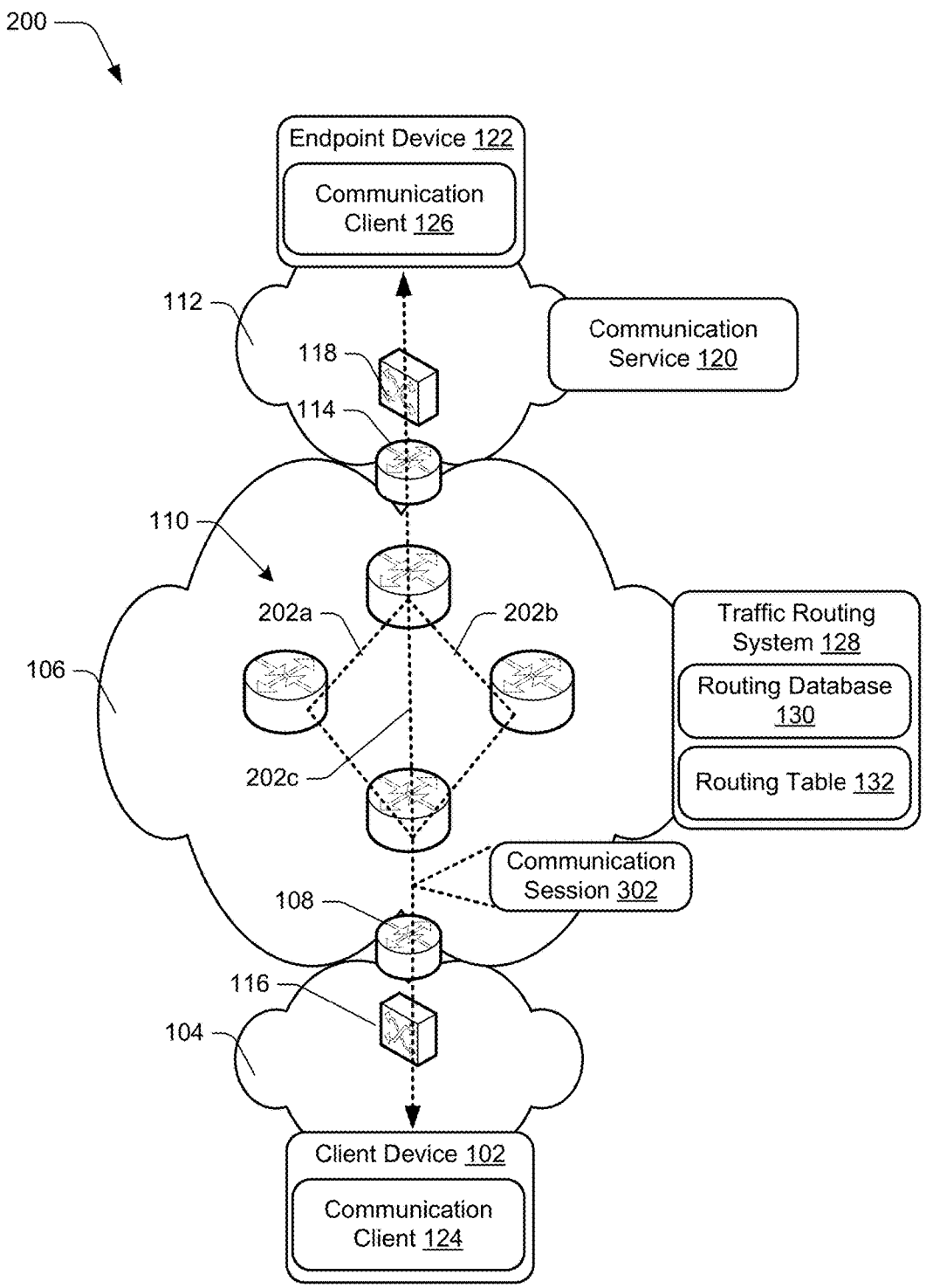
FIG. 2 illustrates an example implementation scenario for mapping different routing paths in accordance with one or more embodiments.

FIG. 2 illustrates an example implementation scenario 200 for mapping different routing paths in accordance with one or more implementations. The scenario 200 includes various entities and components introduced above with reference to the environment 100.

In the scenario 200, the TR system 128 maps routing paths across the core network 106. For instance, the TR system 128 maps a routing path 202a, a routing path 202b, and a routing path 202c across the core network 106. Generally, the individual routing paths 202a-202c are each associated with different respective sets of the core routers 110, and thus each represent different paths for routing data between the client network 104 and the service network 112. As referenced above, the core network 106 can be implemented as an MPLS network. Thus, in such implementations the routing paths 202a-202c represent different LSPs across the core network 106.

The TR system 128 records information for the routing paths 202a-202c in the routing DB 130, such as identifiers for instances of the core routers 110 for each of the individual routing paths 202a-202c, as well as identifiers for other network components that occur along the routing paths 202a-202c. Thus, the TR system 128 can communicate identifiers for the individual routing paths 202a-202c to different entities to enable the entities to leverage the different routing paths for communicating data across the core network 106.

According to various implementations, the TR system 128 also stores data flow attributes for the different routing paths 202a-202c in the routing DB 130, such as flow capacity (e.g., bandwidth) for the individual routing paths, current and historical data flow metrics (e.g., signal quality) for the individual routing paths, and so forth. The TR system 128 can use these data flow attributes to select a routing path to be used for a particular data flow, and to propagate a routing path table that identifies the routing path to entities involved in the data flow. For instance, consider the following implementation scenario.

Figure 3:
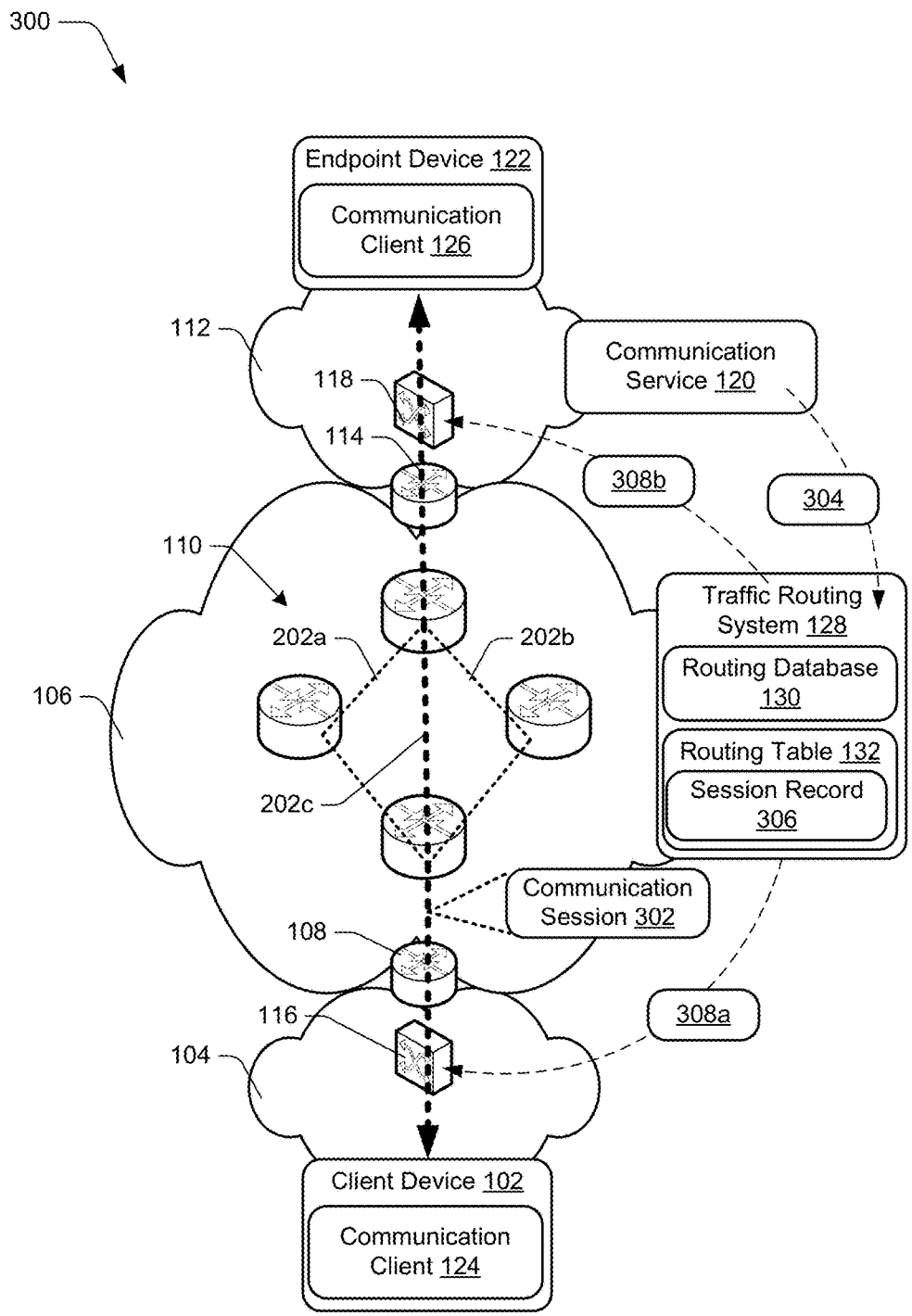
FIG. 3 illustrates an example implementation scenario for selecting a routing path for a communication session in accordance with one or more embodiments.

FIG. 3 illustrates an example implementation scenario 300 for selecting a routing path for a communication session in accordance with one or more implementations. The scenario 300 includes various entities and components introduced above with reference to the environment 100. In at least some implementations, the scenario 300 represents an extension of the scenario 200 described above.

In the scenario 300, a communication session 302 is initiated by the communication client 124 of the client device 102 with the communication client 126 of the endpoint device 122. For instance, the user selects an indicia indicating a request to initiate the communication session, such as by entering a phone number for the endpoint device 122, selecting a contact from a contact list, selecting a hyperlink for the communication client 126, and so forth. Generally, the communication session 302 involves an exchange of communication media, such as voice media, video media, content sharing, and so forth. The communication session 302, for instance, represents a UC session between the communication client 124 and the communication client 126.

According to various implementations, when the communication session 302 is initiated by the client device 102, a routing path for routing the communication session 302 is selected by the network switch 116. For instance, the network switch 116 selects the routing path 202c for routing the communication session 302 to the endpoint device 122. The network switch 116, for example, selects the routing path 202c utilizing any suitable algorithm, such as a shortest path algorithm. For instance, the routing path 202c represents a shortest path across the core network 106 between the client device 102 and the endpoint device 122. Accordingly, the communication session 302 is routed between the client device 102 and the endpoint device 122 utilizing the routing path 202c.

Further to the scenario 300, the communication session 302 is implemented via interaction between the communication clients 124, 126 and the communication service 120. For instance, the communication service 120 manages initiation of the communication session 302. Accordingly, in response to initiation of the communication session 302, the communication service 120 communicates a session notification 304 to the TR system 128. Generally, the session notification 304 notifies the TR system 128 that the communication session 302 is initiated across the core network 106, and includes attributes of the communication session 302.

In at least some implementations, the session notification 304 is generated using the communication API described above, and thus can be populated with values for the various events and attributes described with reference to the communication API. For instance, the session notification 304 includes identifiers for the client device 102 and the endpoint device 122, and specifies media types that are involved in the communication session 302.

The TR system 128 utilizes attributes from the session notification 304 to identify a best path candidate for routing the communication session 302 across the core network 106. For instance, the session notification 304 indicates that the communication session 302 has a high bandwidth requirement, such as based on media types identified for the communication session 302. Accordingly, the TR system 128 identifies a routing path of the routing paths 202a-202c that is best able to handle the bandwidth requirement of the communication session. The TR system 128, for example, searches the routing DB 130 for a routing path that is identified as having a high bandwidth capacity.

The TR system 128 also creates a session record 306 in the routing table 132 for the communication session 302. For instance, the session record 306 is used to identify the communication session 302 in the routing table 132, such as via identification information from the session notification 304. The session record 306 also specifies that the routing path 202a is selected as a best candidate routing path for routing the communication session 302.

The session record 206 is also leveraged to track information about the communication session 302, such as performance attributes of data flow across the routing path 202a during the communication session. For instance, during the communication session, the TR system 128 can dynamically update the session record 306 with performance statistics for the communication session, such as received from the communication service 120 and/or the communication clients 124, 126. Examples of such performance statistics include values for packet throughput rate, bandwidth across the routing path 202a, jitter, packet latency, user input regarding performance quality, and so forth.

Further to the scenario 300, the TR system 128 communicates a routing notification 308a to the network switch 116, and a routing notification 308b to the network switch 118. Generally, the routing notifications 308a, 308b identify the communication session 302 and specify a routing path to be used for routing the communication session 302. For instance, the routing notifications 308a, 308b identify instances of the core routers 110 (and optionally other network components) across which the communication session 302 is to be routed. As further detailed below, information from the routing notifications 308a, 308b is utilized by the respective network switches 116, 118 to route the communication session 302.

Figure 4:
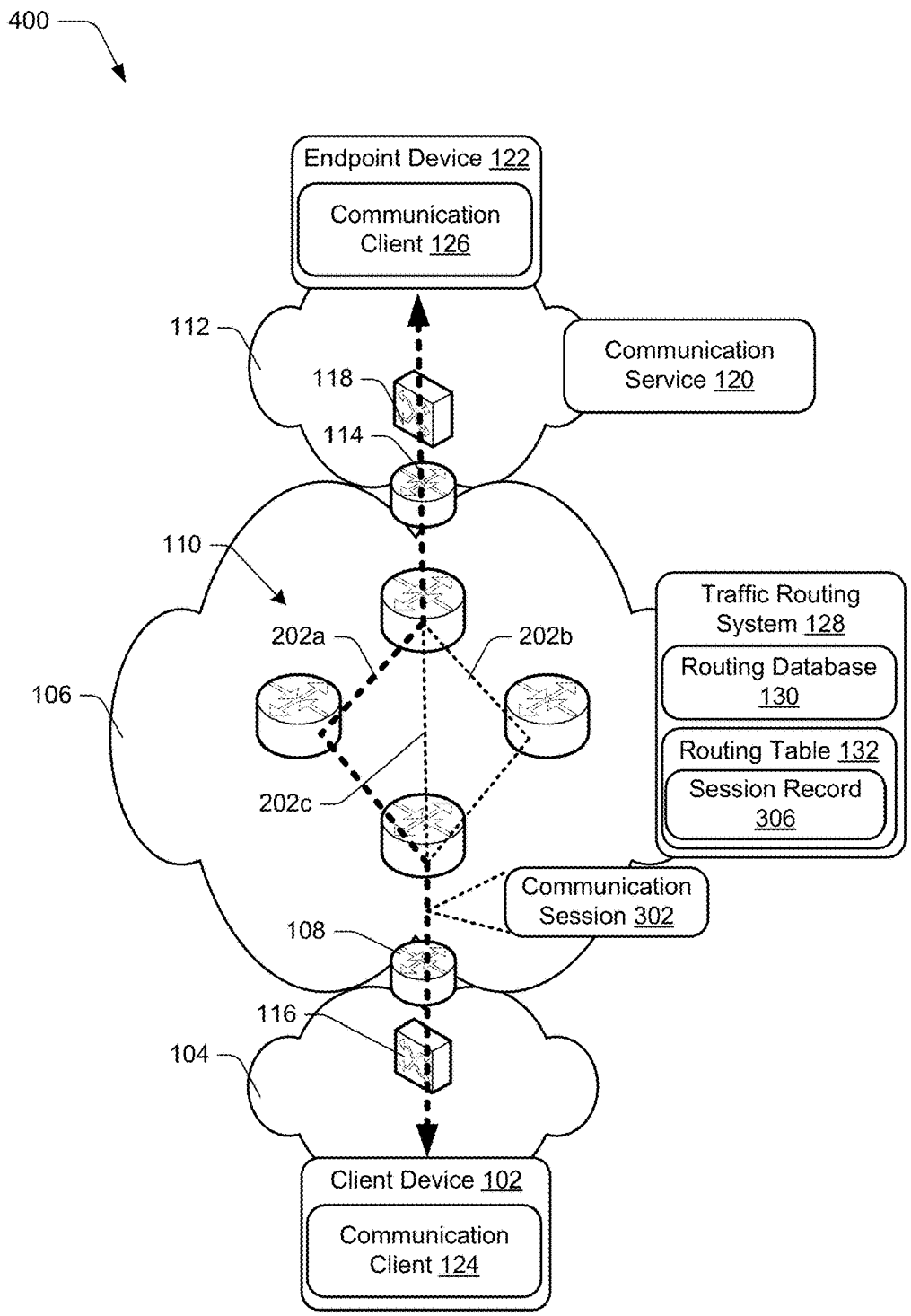
FIG. 4 illustrates an example implementation scenario for rerouting a communication session in accordance with one or more embodiments.

FIG. 4 illustrates an example implementation scenario 400 for rerouting a communication session in accordance with one or more implementations. The scenario 400 includes various entities and components introduced above with reference to the environment 100. In at least some implementations, the scenario 400 represents an extension of the scenarios 200, 300 described above.

In the scenario 400, the communication session 302 is in progress between the client device 102 and the endpoint device 122. Further, the network switch 116 has received the routing notification 306a from the TR system 128 identifying a routing path to be used for routing the communication session. In this particular example, the routing notification 306a identifies the routing path 202a. For instance, even though the routing path 202c may be the shortest path between the client device 102 and the endpoint device 122, the TR system 128 ascertains that the routing path 202a is a best path for routing the communication session 302 across the core network 106. The routing path 202a, for example, has a higher bandwidth capacity than the routing path 202c, and/or is indicated as having a higher signal quality than the routing path 202c.

Accordingly, the network switch 116 reroutes the communication session 302 from the routing path 202c to the routing path 202a. Similarly, and based on the routing notification 306b, the network switch 118 reroutes the communication session 302 from the endpoint device 122 across the routing path 202a, e.g., as a return path to the client device 102.

According to various implementations, the scenarios described above occur in real-time and in response to initiation of a communication session. For instance, the communication session 302 is rerouted to the routing path 202a in real-time while the communication is in progress. Thus, techniques described herein enable real-time path optimization for communication sessions. Further, while a single path rerouting is described, it is to be appreciated that techniques for routing communication sessions described herein can be dynamically applied to cause a communication session to be rerouted multiple times, such as based on changes in routing path performance.

Figure 5:
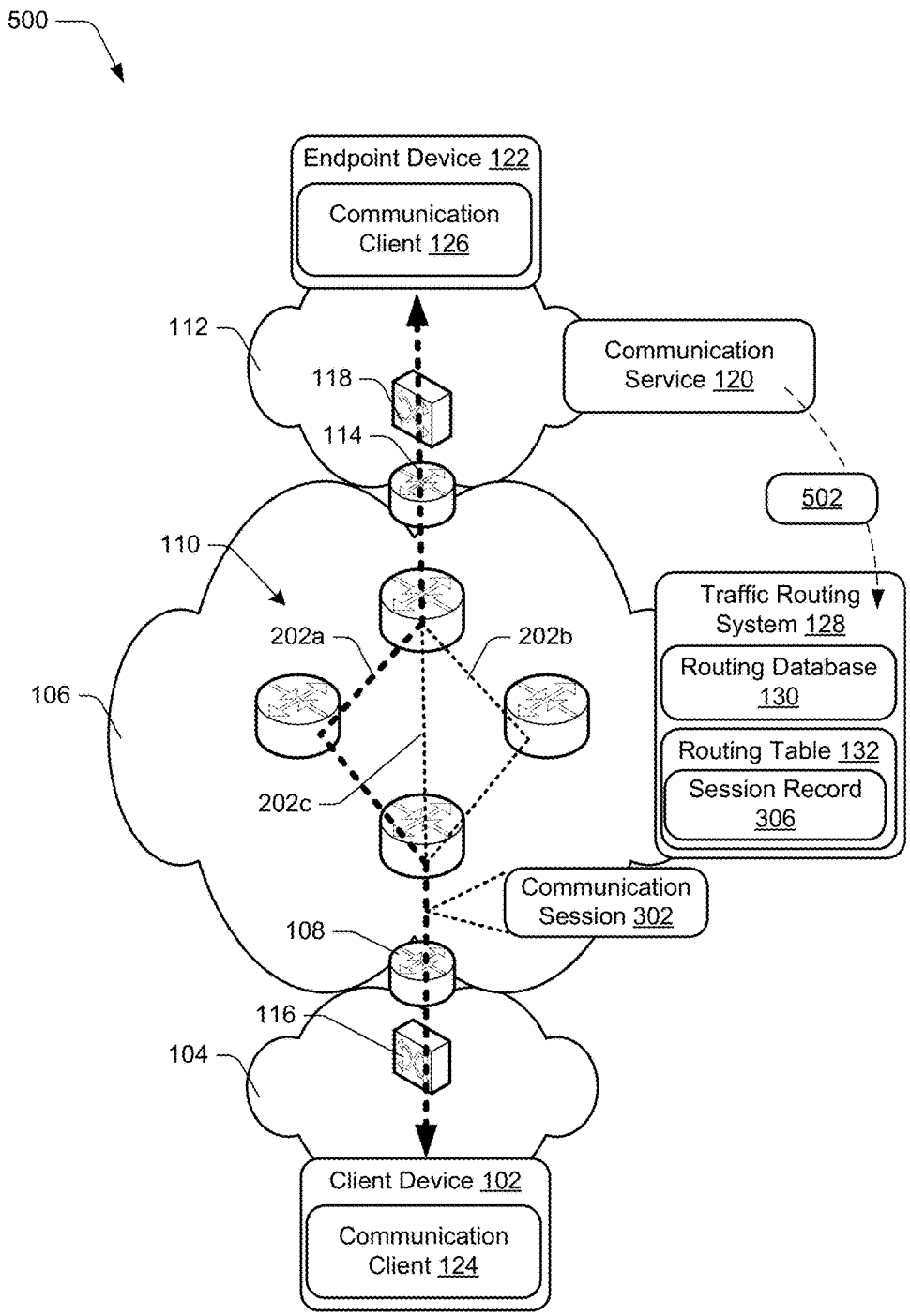
FIG. 5 illustrates an example implementation scenario for updating routing path awareness in accordance with one or more embodiments.

FIG. 5 illustrates an example implementation scenario 500 for updating routing path awareness in accordance with one or more implementations. The scenario 500 includes various entities and components introduced above with reference to the environment 100. In at least some implementations, the scenario 500 represents an extension of the scenarios 200-400 described above.

In the scenario 500, the communication session 302 is in progress between the client device 102 and the endpoint device 122. Further, the communication session 302 has been rerouted to the routing path 202a. While the communication session 302 is in progress, the communication service 120 communicates a status notification 502 to the TR system 128. Generally, the status notification 502 indicates status information for the communication session 302, such as performance quality of the communication session 302 across the routing path 202a, errors that occur during the communication session 302, and so forth. In at least some implementations, the status notification 502 is generated using the communication API described above, and thus is populated with values for at least some of the attributes of the communication API. The status notification 502 may be generated based on attributes of the communication session 302 directly detected by the communication service 120, and/or based on information detected by the communication clients 124, 126 and propagated to the communication service 120.

Utilizing information from the status notification 502, the TR system 128 updates the session record 306. For instance, the session record 306 is updated to indicate current and historic session attributes for the communication session 302, such as session quality, session errors, and so forth. In at least some implementations, the TR system 128 may utilize information from the session record 306 to update the routing DB 130, such as to indicate data flow quality observed across the routing path 202a. Thus, attributes of routing paths may be dynamically updated in the routing DB 130 to accommodate changes observed across different routing paths and for different data flows.

Figure 6:
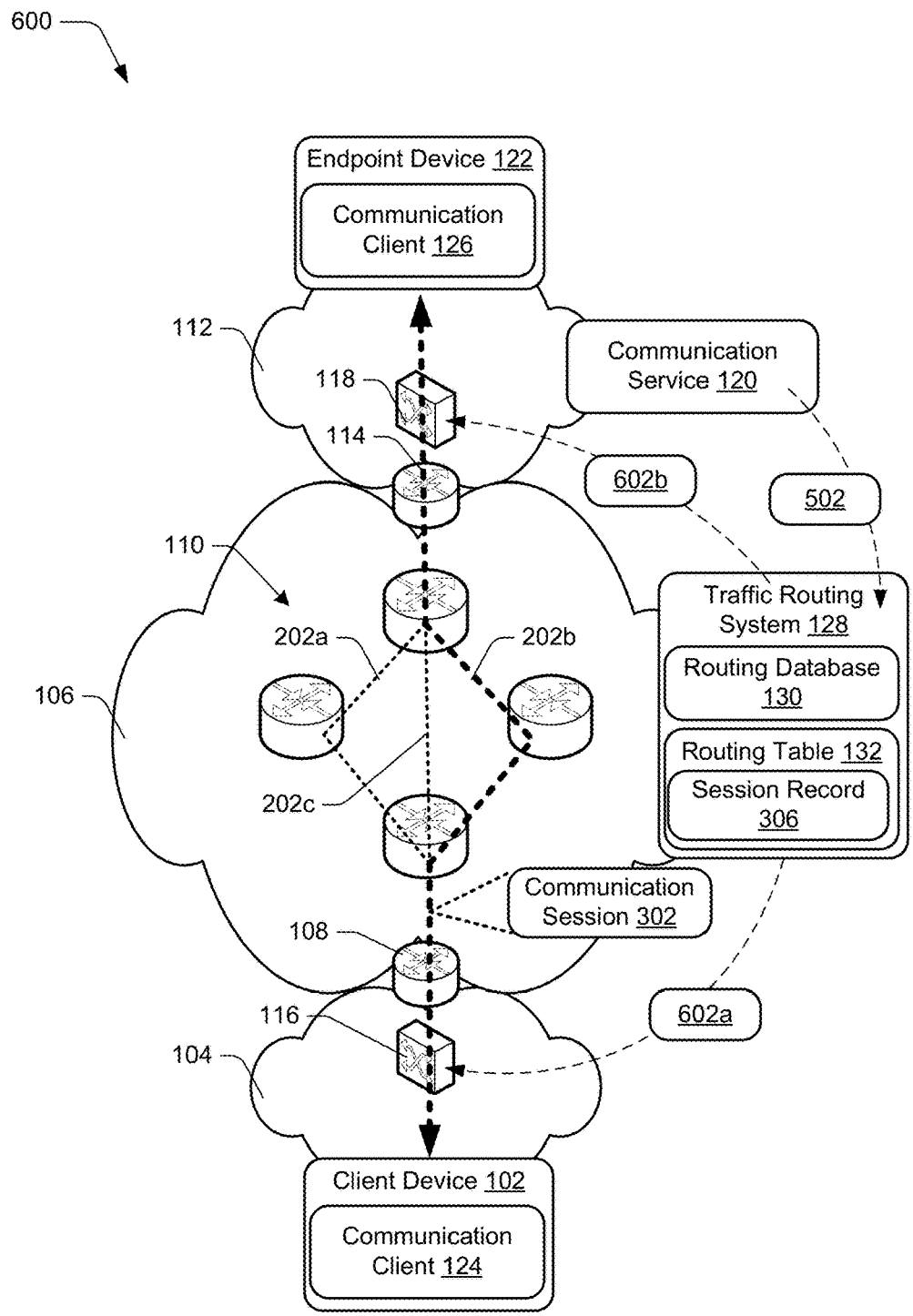
FIG. 6 illustrates an example implementation scenario for rerouting a communication session to optimize performance in accordance with one or more embodiments.

FIG. 6 illustrates an example implementation scenario 600 for rerouting a communication session to optimize performance in accordance with one or more implementations. The scenario 600 includes various entities and components introduced above with reference to the environment 100. In at least some implementations, the scenario 600 represents an extension of the scenarios 200-500 described above.

In the scenario 600, the communication session 302 is in progress between the client device 102 and the endpoint device 122. While the communication session 302 is in progress, the TR system 128 detects performance degradation in the data flow of the communication session 302. For instance, one or more attributes identified in the status notification 502 indicate that performance degradation for data flow of the communication session 302. Examples of such attributes include jitter values, packet loss, packet latency, and so forth, exceeding a specified threshold value and/or values. The status notification 502, for example, includes various attributes of the communication session 302, and can be generated using the communication API referenced above. For instance, the status notification 502 includes values for a session problem event generated via the communication API, and/or attributes of the communication session that resulted in the indication of performance degradation. Based on identification information included in the status notification 502 (e.g., IP addresses for the client device 102 and/or the endpoint device 122), the TR system 128 matches the status notification 502 to the session record 306 for the communication session.

Other examples of attributes that may indicate performance degradation include bandwidth across the routing path 202a falling below a specified threshold, an error message from a component of the routing path 202a, input from a user indicating performance degradation in the communication session 302, and so forth.

In response to detecting the performance degradation, the TR system 128 identifies a different routing path from the routing DB 130 to be used for rerouting the communication session 302 from the routing path 202a. For instance, historical path data from the routing DB 130 may be searched, and/or active path data from the routing table 132 for active communication sessions may be searched. The TR system 128, for instance, identifies the routing path 202b as a suitable candidate for rerouting the communication session 302. The routing path 202b, for instance, is indicated as having an acceptable level of session quality, such as based on the various session metrics discussed herein.

Further to the scenario 600, the TR system 128 forwards an update notification 602a to the network switch 116, and an update notification 602b to the network switch 118. Generally, the update notifications 602a, 602b identify the communication session 302 and specify the routing path 202b to be used for rerouting the communication session 302. For instance, the routing notifications 602a, 602b identify instances of the core routers 110 (and optionally other network components) that occur along the routing path 202b.

Accordingly, and in response to the update notifications 602a, 602b, the network switches 116, 118 reroute the communication session 302 from the routing path 202a to the routing path 202b.

According to various embodiments, the rerouting described above is implemented without disconnecting and/or interrupting the communication session, independent of user input, and/or independent of a user being notified. Thus, seamless rerouting can be effected with little or no impact on a user experience during a communication session.

The example implementation scenarios presented above are discussed with reference to discrete devices and discrete sets of routing paths for purpose of example only. It is to be appreciated, however, that embodiments may be employed in a variety of different networks and with multiple different devices not expressly discussed herein. Further, connection scenarios are often dynamically changing, and thus techniques discussed herein may be applied dynamically to map and remap routing paths, and to dynamically update quality metrics for routing paths to account for changes in connection attributes.

Having discussed some example implementation scenarios, consider now a discussion of some example procedures in accordance with one or more embodiments.

Example Procedures

The following discussion describes some example procedures for routing communication sessions in accordance with one or more embodiments. The example procedures may be employed in the environment 100 of FIG. 1, the system 900 of FIG. 9, and/or any other suitable environment. In at least some implementations, the steps described for the various procedures can be implemented automatically and independent of user interaction. The procedures, for instance, represent example ways of performing various aspects of the implementation scenarios described above.

Figure 7:
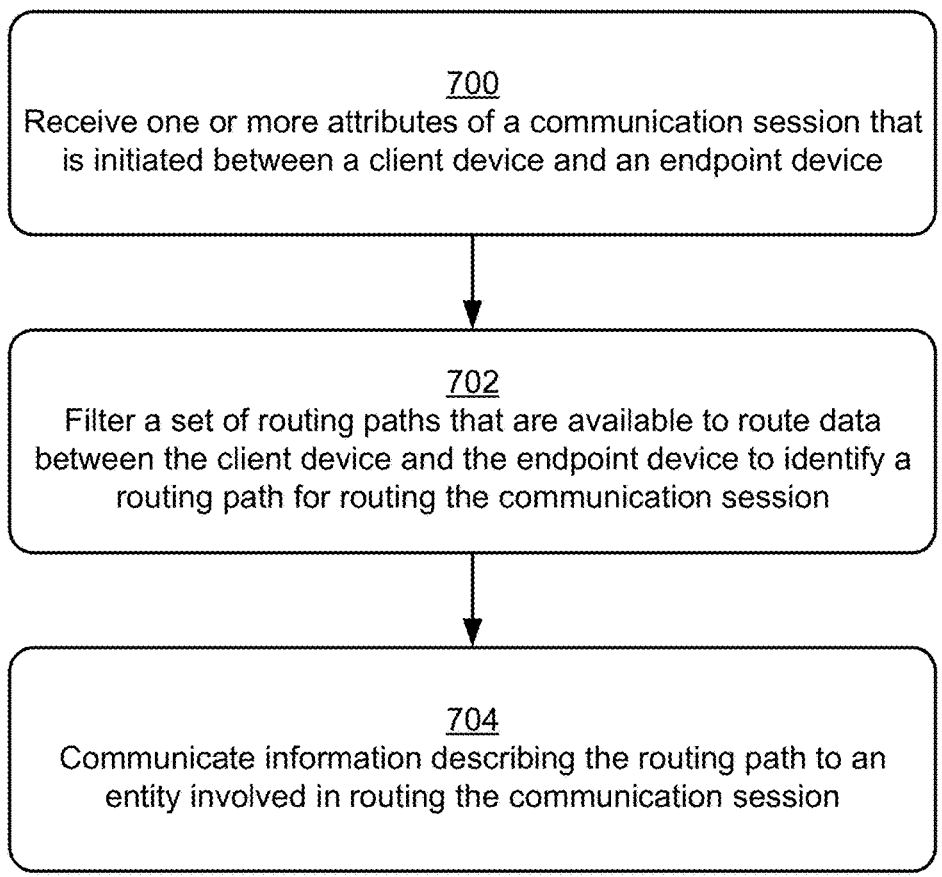
FIG. 7 is a flow diagram that describes steps in a method for selecting a routing path for a communication session in accordance with one or more embodiments.

FIG. 7 is a flow diagram that describes steps in a method in accordance with one or more embodiments. The method describes an example procedure for selecting a routing path for a communication session in accordance with one or more embodiments.

Step 700 receives one or more attributes of a communication session that is initiated between a client device and an endpoint device. The TR system 128, for instance, receives the session notification 304 that identifies attributes of the communication session 302. Examples of different session attributes that may be communicated are discussed above, such as with reference to the communication API.

Step 702 filters a set of routing paths that are available to route data between the client device and the endpoint device to identify a routing path for routing the communication session. For instance, the TR system 128 searches routing paths of the core network 106 identified in the routing DB 130 by comparing the one or more attributes of the communication session to indicia of path capacity and path quality for the routing paths. The path capacity, for instance, indicates a minimum bandwidth and/or a maximum bandwidth for each of the routing paths. Thus, a routing path that is able to provide a bandwidth indicated for the communication session can be selected.

The path quality for the routing paths generally indicates current and/or historical path quality observed for data flows along the individual routing paths. For instance, path quality for a particular routing path may indicate one or more of an average jitter value, an average packet loss rate, an average round trip delay, or an average mean opinion score (MOS) for the particular routing path. Thus, a routing path that has a highest indicated path quality and that is able to provide a bandwidth indicated for the communication session is selected.

As indicated above, techniques described herein can be employed to select Label Switched Paths (LSPs) across a Multi-Protocol Label Switching (MPLS) network. Thus, the routing path may represent an LSP selected from a set of LSPs across an MPLS network.

Step 704 communicates information describing the routing path to an entity involved in routing the communication session. The TR system 128, for instance, communicates information describing the routing path to an entity involved in routing data across the core network 106, such as to one or more of the network switches 116, 118. Generally, communicating this information causes the communication session to be routed via the selected routing path. For instance, the communication session is rerouted to the routing path from a previously-selected routing path.

Figure 8:
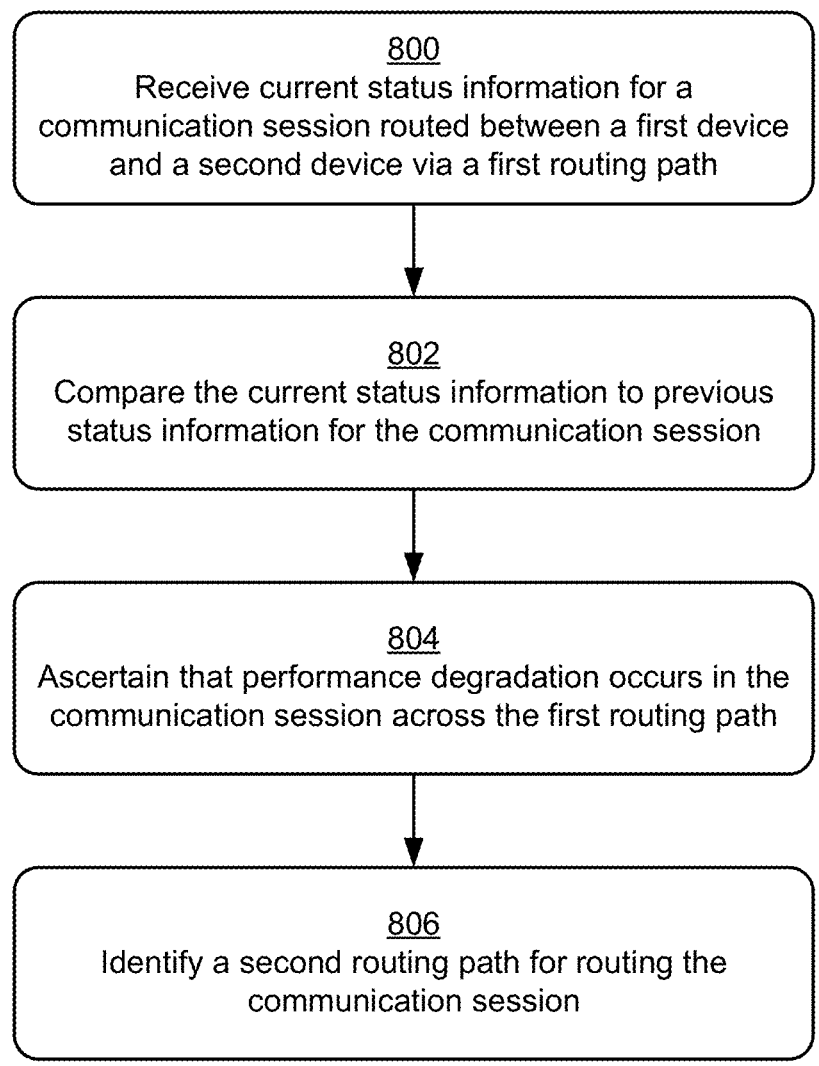
FIG. 8 is a flow diagram that describes steps in a method for rerouting a communication session in accordance with one or more embodiments.

FIG. 8 is a flow diagram that describes steps in a method in accordance with one or more embodiments. The method describes an example procedure for rerouting a communication session in accordance with one or more embodiments.

Step 800 receives current status information for a communication session routed between a first device and a second device via a first routing path. The status information, for instance, indicates various current performance and quality metrics for the communication session. Examples of the different performance and quality metrics are described above with reference to the example communication API.

Step 802 compares the current status information to previous status information for the communication session. The previous status information, for instance, represents historical status information received for the communication session. According to various implementations, the current status information is compared to the previous status information while the communication session is active.

Step 804 ascertains that performance degradation occurs in the communication session across the first routing path. For instance, comparing the current status information to the previous status information indicates a decrease in session quality for the communication session. The decrease in session quality, for instance, may be indicated in various ways, such as an increase in jitter, an increase in packet loss rate, an increase in round trip delay, an increase in concealment ratio, a decrease in mean opinion score (MOS), user feedback indicating a decrease in session quality, and so forth.

Step 806 identifies a second routing path for routing the communication session. The TR system 128, for instance, identifies the second routing path by comparing one or more attributes of the communication session to a set of routing paths identified in the routing DB 130 that are available for routing the communication session between the first device and the second device. Example ways of filtering and selecting routing paths are detailed above.

Step 808 communicates information describing the second routing path to an entity involved in routing the communication session. The TR system 128, for instance, communicates information describing the second routing path to an entity involved in routing data across the core network 106, such as to one or more of the network switches 116, 118. Generally, communicating this information causes the communication session to be rerouted from the first routing path to the second routing path.

According to various implementations, the various aspects of the implementations scenarios and procedures described above are performed without handling data of a communication session. For instance, the TR system 128 receives attributes of communication sessions and selects routing paths for the communication sessions without receiving and handling media data of the communication sessions.

Accordingly, techniques described herein provide for performance optimization for communication sessions such as by selecting best candidate paths for routing communication sessions. Further, performance degradation experienced during a communication session is mitigated by selecting replacement routing paths that can be leveraged to increase session quality for the communication session.

Having discussed some example procedures, consider now a discussion of an example system and device in accordance with one or more embodiments.

Example System and Device

Figure 9:
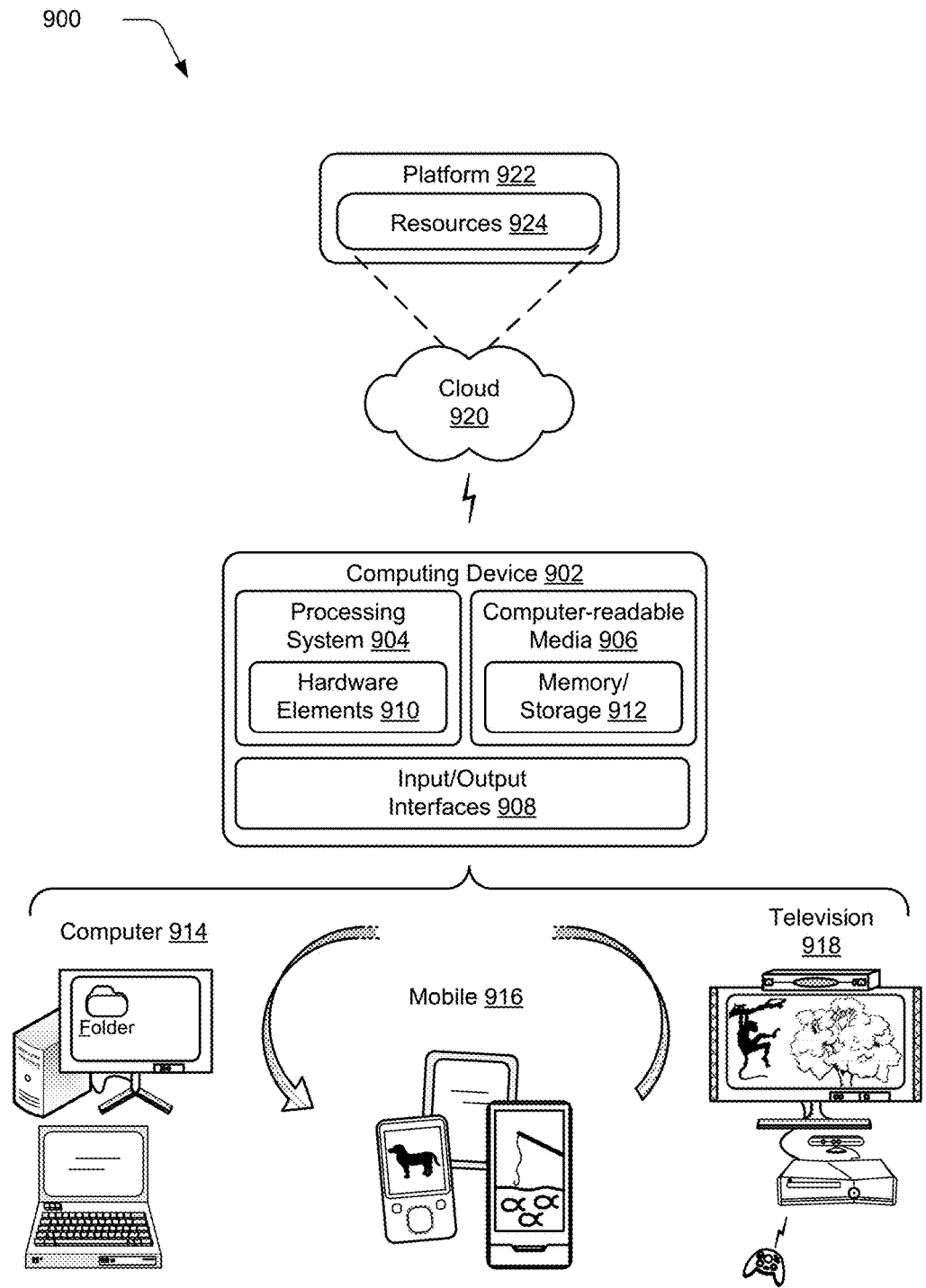
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the client device 102, the endpoint device 122, and/or the TR system 128 discussed above with reference to FIG. 1 can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the TR system 128 and/or the communication service 120 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1: A system for selecting a routing path for routing a communication session, the system including: at least one processor; and one or more computer-readable storage media including instructions stored thereon that, responsive to execution by the at least one processor, cause the system perform operations including: receiving one or more attributes of a communication session that is initiated between a client device and an endpoint device; filtering a set of routing paths that are available to route data between the client device and the endpoint device by comparing the one or more attributes of the communication session to indicia of path capacity and path quality for the routing paths to identify a routing path for routing the communication session; and communicating information describing the routing path to an entity involved in routing the communication session to cause the communication session to be routed via the routing path.

Example 2: A system as described in example 1, wherein the attributes of the communication session include one or more media types for the communication session.

Example 3: A system as described in one or more of examples 1 or 2, wherein the attributes of the communication session include a minimum bandwidth for the communication session, and wherein said filtering includes identifying the routing path as having a bandwidth capacity to handle the minimum bandwidth for the communication session.

Example 4: A system as described in one or more of examples 1-3, wherein the set of routing paths includes a set of existing Label Switched Paths (LSPs) across a Multi-Protocol Label Switching (MPLS) network.

Example 5: A system as described in one or more of examples 1-4, wherein the set of routing paths includes a set of existing Label Switched Paths (LSPs) that are selectable for routing the communication session from a Software-Defined Network (SDN).

Example 6: A system as described in one or more of examples 1-5, wherein said filtering includes searching a routing database that includes records for the routing paths, the records specifying path quality and path capacity for the routing paths.

Example 7: A system as described in one or more of examples 1-6, wherein the indicia of path quality includes indicia of communication session performance across the individual routing paths.

Example 8: A system as described in one or more of examples 1-7, wherein the system is configured to perform the operations in real-time while the communication session is in progress.

Example 9: A system as described in one or more of examples 1-8, wherein the system is configured to perform the operations without handling data of the communication session.

Example 10: A system as described in one or more of examples 1-9, wherein said communicating information describing the routing path causes the communication session to be rerouted from a previous routing path to the routing path.

Example 11: A system as described in one or more of examples 1-10, wherein the operations further include: receiving a status notification that indicates a status of the communication session; ascertaining based on the status notification that performance degradation occurs in the communication session; and identifying a different routing path from the set of routing paths to be used to reroute the communication session from the routing path.

Example 12: A computer-implemented method for selecting a routing path for routing a communication session, the method including: receiving one or more attributes of a communication session between a client device and an endpoint device; filtering by a computing system a set of Label Switched Paths (LSPs) of a Multi-Protocol Label Switching (MPLS) network that are available to route data between the client device and the endpoint device by comparing the one or more attributes of the communication session to indicia of path capacity and path quality for the LSPs to identify a particular LSP for routing the communication session; and communicating by the computing system information describing the LSP to an entity involved in routing the communication session across the MPLS network to cause the communication session to be routed within the MPLS network via the particular LSP.

Example 13: A method as described in example 12, wherein said filtering and said communicating are performed while the communication session is in progress.

Example 14: A method as described in one or more of examples 12 or 13, wherein said filtering and said communicating are performed without handling data of the communication session.

Example 15: A method as described in one or more of examples 12-14, wherein said filtering includes identifying the particular LSP based on the particular LSP meeting one or more of a minimum path quality or a minimum path capacity for the communication session.

Example 16: A method as described in one or more of examples 12-15, wherein said filtering includes filtering the set of LSPs based on one or more of historical performance metrics or current performance metrics for the individual LSPs.

Example 17: A computer-implemented method for selecting a routing path for rerouting a communication session, the method including: receiving current status information for a communication session routed between a first device and a second device via a first routing path; ascertaining by a computing system and by comparing the current status information to previous status information for the communication session that performance degradation occurs in the communication session across the first routing path and while the communication session is active; identifying by the computing system a second routing path for routing the communication session by comparing one or more attributes of the communication session to a set of routing paths that are available for routing the communication session between the first device and the second device; and communicating information describing the second routing path to an entity involved in routing the communication session to cause the communication session to be rerouted from the first routing path to the second routing path.

Example 18: A method as described in example 17, wherein said receiving includes receiving the status information while the communication session is active, and wherein said communicating information describing the second routing path causes the communication session to be rerouted from the first routing path to the second routing path in real-time while the communication session is active.

Example 19: A method as described in one or more of examples 17 or 18, wherein the first routing path and the second routing path include Label Switched Paths (LSPs) of a Multi-Protocol Label Switching (MPLS) network.

Example 20: A method as described in one or more of examples 17-19, wherein the comparing the status information to previous status information for the communication session indicates an increase in one or more of jitter, packet drop, or packet latency across the first routing path.

Conclusion

Techniques for routing communication sessions are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:
1. A system comprising:
at least one processor; and
one or more computer-readable storage media including
  instructions stored thereon that, responsive to execution
  by the at least one processor, cause the system perform
  operations including:
  receiving one or more attributes of a communication
    session that is initiated between a client device and
    an endpoint device;
  searching a database to identify a set of routing paths
    that are available to route data between the client
    device and the endpoint device by comparing the one
    or more attributes of the communication session to
    indicia of path capacity and indicia of path quality
    for the set of routing paths to identify a particular
    routing path for routing the communication session,
    the database indicating historic data flow quality for
    one or more previous communication sessions across
    each routing path, the particular routing path being
    selected based on a historical data flow quality of the
    particular routing path;
  communicating information describing the particular
    routing path to an entity involved in routing the communication session to cause the communication session to be routed via the particular routing path;

ascertaining, while the communication session is in progress, that performance degradation in a quality of the communication session occurs;

identifying, from the database, a different routing path from the set of routing paths to be used to reroute the communication session from the particular routing path;

communicating information describing the different routing path to the entity involved in routing the communication session to cause the communication session to be rerouted via the different routing path;

updating the database to indicate that the performance degradation in the quality of the communication session occurred on the particular routing path; and filtering the set of routing paths from the database in response to a request for a routing path for a different communication session such that the particular routing path is not selected for the different communication session based on the database indicating the performance degradation in the quality of the communication session.

2. A system as recited in claim 1, wherein the attributes of the communication session include one or more media types for the communication session.

3. A system as recited in claim 1, wherein the attributes of the communication session include a minimum bandwidth for the communication session, and wherein the particular routing path is identified based on the particular routing path having a bandwidth capacity to handle the minimum bandwidth for the communication session.

4. A system as recited in claim 1, wherein the database further characterizes each routing path based on path capacity for the routing paths.

5. A system as recited in claim 1, wherein the indicia of path quality comprises indicia of communication session performance across each of the routing paths.

6. A system as recited in claim 1, wherein the system is configured to perform the operations in real-time while the communication session is in progress.

7. A system as recited in claim 1, wherein the system is configured to perform the operations without handling data of the communication session.

8. A system as recited in claim 1, wherein said communicating information describing the particular routing path causes the communication session to be rerouted from a previous routing path to the particular routing path.

9. A system as described in claim 1, wherein the operations further include:
creating a session record that identifies the communication session and the particular routing path; and
dynamically updating the session record while the communication session is in progress to include session quality information for the communication session.

10. A system as described in claim 1, wherein the operations further include:
creating a session record that identifies the communication session and the particular routing path; and
dynamically updating the session record while the communication session is in progress to indicate changes in connection quality across the particular routing path.

11. A system as described in claim 1, wherein the database identifies a router along the particular routing path, and includes one or more quality metrics for data flow across the router.

12. A system as described in claim 1, further comprising communicating information describing the different routing path from the set of routing paths to the entity involved in routing the communication session to cause the communication session to be rerouted from the particular routing path to the different routing path from the set of routing paths.

13. A computer-implemented method, comprising:
receiving one or more attributes of a communication session between a client device and an endpoint device;
searching by a computing system a database to identify a set of routing paths that are available to route data across a network between the client device and the endpoint device by comparing the one or more attributes of the communication session to indicia of path capacity and indicia of path quality for the routing paths to identify a particular routing path for routing the communication session, the database indicating historic data flow quality across each routing path, and the particular routing path being selected based on a historical data flow quality of the particular routing path;
communicating by the computing system information describing the particular routing path to an entity involved in routing the communication session across the network to cause the communication session to be routed using the particular routing path;
ascertaining that performance degradation occurs in a quality of the communication session;
identifying, from the database, a different routing path from the set of routing paths to be used to reroute the communication session from the particular routing path;
communicating information describing the different routing path to the entity involved in routing the communication session to cause the communication session to be rerouted via the different routing path;
updating the database to indicate that the performance degradation in the quality of the communication session occurred on the particular routing path; and
filtering the set of routing paths from the database in response to a request for a routing path for a different communication session such that the particular routing path is not selected for the different communication session based on the database indicating the performance degradation in the quality of the communication session.

14. A method as described in claim 13, wherein said searching and said communicating are performed while the communication session is in progress.

15. A method as described in claim 13, wherein said searching and said communicating are performed without handling data of the communication session.

16. A method as described in claim 13, wherein said searching comprises identifying the particular routing path based on the particular routing path being identified in the database as meeting one or more of a minimum path quality or a minimum path capacity for the communication session.

17. A method as described in claim 13, wherein said searching further comprises searching the database based on current performance metrics for individual routing paths in the set of routing paths.

18. A computer-implemented method, comprising:
receiving current status information for a communication session routed between a first device and a second device via a first routing path;
maintaining, by a computing system and while the communication session is in progress, active state of awareness of a set of routing paths via real-time records that include attributes of routing paths that are not currently involved in the communication session, the attributes of routing paths including indicia of path quality for the routing paths;

ascertaining, by the computing system and by comparing the current status information to previous status information for the communication session, that performance degradation occurs in the communication session across the first routing path and while the communication session is active, the previous status information being maintained in a session record for the communication session, the session record including historic session quality information for the communication session;

identifying by the computing system a second routing path for routing the communication session by comparing one or more attributes of the communication session to the set of routing paths that are available for routing the communication session between the first device and the second device;

communicating information describing the second routing path to an entity involved in routing the communication session to cause the communication session to be rerouted from the first routing path to the second routing path;

updating the real-time records to indicate the performance degradation for the communication session on the first routing path; and filtering the set of routing paths from the real-time records in response to a request for a routing path for a different communication session such that the first routing path is not selected for the different communication session based on the real-time records indicating the performance degradation for the communication session.

19. A method as described in claim 18, wherein said receiving comprises receiving the current status information while the communication session is active, and wherein said communicating information describing the second routing path causes the communication session to be rerouted from the first routing path to the second routing path in real-time while the communication session is active.

20. A method as described in claim 18, wherein the comparing the current status information to previous status information for the communication session indicates an increase in one or more of jitter, packet drop, or packet latency across the first routing path.

* * * * *